United States Patent [19]

Tone et al.

[11] Patent Number: 4,733,350
[45] Date of Patent: Mar. 22, 1988

[54] IMPROVED PURGE ARRANGEMENT FOR AN ADDRESS TRANSLATION CONTROL SYSTEM

[75] Inventors: Hirosada Tone, Fuchu; Tsutomu Tanaka, Yokohama, both of Japan

[73] Assignee: Fujitsu Limited, Kanagawa, Japan

[21] Appl. No.: 682,509

[22] Filed: Dec. 17, 1984

[30] Foreign Application Priority Data

Dec. 29, 1983 [JP] Japan ................... 58-246112

[51] Int. Cl.$^4$ ............................................. G06F 12/08
[52] U.S. Cl. ...................................................... 364/200
[58] Field of Search ... 364/200 MS File, 900 MS File

[56] References Cited

U.S. PATENT DOCUMENTS

| 4,053,948 | 11/1977 | Hogan et al. | 364/200 |
| 4,068,303 | 1/1978 | Morita | 364/200 |
| 4,163,288 | 7/1970 | Vinot | 364/900 |
| 4,373,179 | 2/1983 | Katsumata | 364/200 |
| 4,376,927 | 3/1983 | Anderson et al. | 364/200 |
| 4,481,573 | 11/1984 | Fukunaga et al. | 364/200 |

FOREIGN PATENT DOCUMENTS 0067344  5/1982  European Pat. Off. .

OTHER PUBLICATIONS

IBM Technical Disclosure Bulletin, "System for Purging TLB", by Coscarella and Sellers, vol. 24, No. 2, Jul. 1981.

IBM Technical Disclosure Bulletin, "Fast Purging for an Array Table", by Lin, vol. 23, No. 3, Aug. 1980.

Primary Examiner—Gary V. Harkcom
Assistant Examiner—David L. Clark
Attorney, Agent, or Firm—Armstrong, Nikaido, Marmelstein & Kubovcik

[57] ABSTRACT

An address translation control system comprising an address translation buffer having a plurality of entries each including at least a valid flag, a logical address field, and a physical address field, a memory array having copies of at least the valid flag and the physical address field, and a purge register for storing information showing a portion of the contents of the address translation buffer to partially purge the address translation buffer. When coincidence between the physical address of the address translation buffer and the contents of the purge register does not occur, ordinary access processing is carried out, and when entry of the memory array is accessed in turn and coincidence between the physical address in the memory array and the contents of the purge register occurs, purge is performed by clearing the valid flags of the corresponding entries of the address translation buffer and the memory array. Thus, purge processing can be carried out separately from the ordinary access processing, and the application efficiency for the address translation buffer increases. Particularly, the performance efficiency for the application of this invention to a pipeline system or a virtual machine can be increased.

7 Claims, 3 Drawing Figures

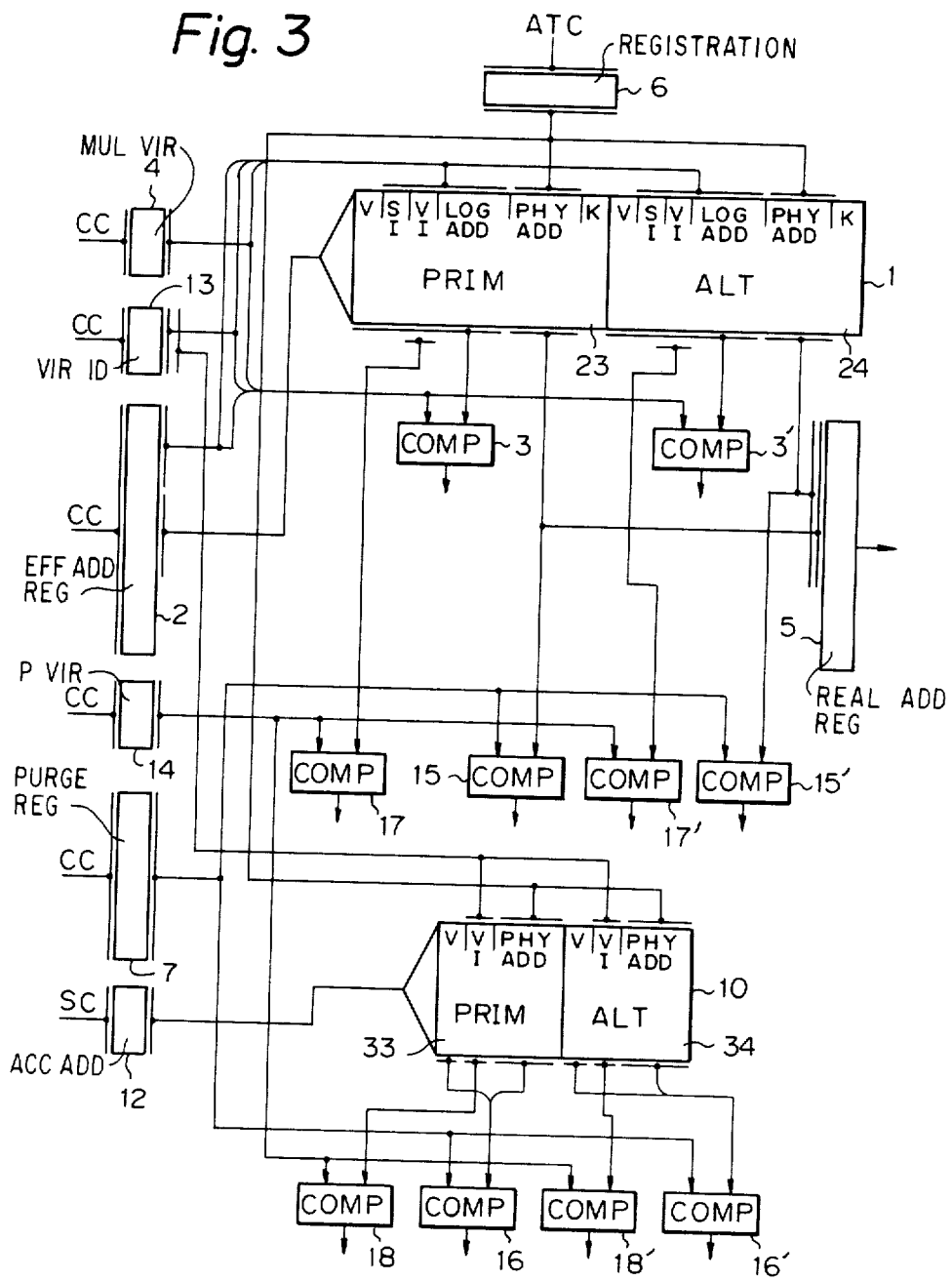

IMPROVED PURGE ARRANGEMENT FOR AN ADDRESS TRANSLATION CONTROL SYSTEM

BACKGROUND OF THE INVENTION

1. Field of the Invention

The present invention relates to an address translation control system, more particularly to an address translation control system which, in addition to an address translation buffer performing a high speed translation from a logical address to a physical address, comprises a memory array copied from a portion of the contents of the address translation buffer, and in which a partial purge in the address translation buffer is performed by searching the memory array.

2. Description of the Related Art

In a data processing system using a virtual storage method, the translation from a logical address to a physical address at a high speed is performed by an address translation control system wherein address translated pairs of logical addresses and physical addresses are registered in a TLB (Translation Lookaside Buffer), i.e., an address translation buffer, and a high speed address translation is performed by accessing the address translation buffer.

The address translation buffer comprises a primary block and an alternate block, wherein each block has a plurality of entries. Each entry comprises a valid flag showing the validity of the entry, a multiple virtual storage identification field identifying a multiple virtual storage space, a logical address field, a physical address field, and a storage protection key field.

In a conventional address translation control system having such an address translation buffer, for an ordinary command fetch or operand access, the above-mentioned address translation buffer is accessed by applying a portion of the logical address to be translated, i.e., access address from an effective address register. By this accessing, the entire contents of the accessed entry stored in the primary block and the alternate block in the address translation buffer are read. A multiple virtual storage identification and the partial logical address which are read from the address translation buffer are compared with a multiple virtual storage identification from a multiple virtual storage identification register and another portion of the logical address from the effective address register, respectively. If the identifications of the comparing contents are obtained, the physical address in the entry is sent to a real address register as a physical address corresponding to a logical address in the effective address register.

In a virtual storage system, since the logical address covers a wider range than the utilizable physical address, a physical address, in turn, is allocated to another logical address when the physical address becomes non-utilizable. At that time, if a translation table in a main storage unit is renewed, since pairs of logical addresses and physical addresses translated before the renewal may remain in the address translation buffer, the pairs must be searched for and then purged. For this reason, in a conventional address translation control system, a partial purge method wherein each entry in the address translation buffer is searched for a physical address, is frequently used. According to this method, when a physical address to be purged is applied to a purge register, the access address in the effective address register is sequentially increased, an entry in the address translation buffer is sequentially read, the physical address in the purge register is compared with the physical address in the address translation buffer, and if the addresses are identical, a valid flag of the entry is made invalid.

In such a conventional address translation control system, when the partial purge is carried out, since all the contents of the address translation buffer must be read out, there is a defect in that the address translation buffer cannot be used at an ordinary command fetch or operand access.

The above defect in the conventional address translation control system causes a decrease in the operating efficiency of the address translation buffer, and in particular a considerable reduction in the performance when using the pipeline method.

SUMMARY OF THE INVENTION

An object of the present invention is to provide an address translation control system wherein a partial purge of an address translation buffer can be processed separately from an ordinary command fetch or operand access, thus allowing no decrease in the operating efficiency of the address translation buffer, and achieving a high performance when using the pipeline method.

The above object is accomplished by adding to the system a memory array which provides duplicate storage of a portion of the information that is contained in the address translation buffer. This allows the system to be operated in a manner so as to accomplish a purge of those address pairs which have been translated while at the same time keeping the address translation buffer available for continued operation of its address translation function. This operation is carried out by using the memory array for command fetch or operand access in the purge process so that the address translation buffer can continue to be used in its normal manner while the purge process is performed. The manner of operating the system and the novel features of the invention will become apparent from the description of preferred embodiments of the invention as shown in the drawings.

BRIEF DESCRIPTION OF THE DRAWINGS

FIG. 3 is a block circuit diagram showing an address translation control system according to a second embodiment of the present invention.

DESCRIPTION OF THE PREFERRED EMBODIMENTS

Prior to the explanation of the embodiments of the present invention, a conventional address translation control system is explained with reference to FIG. 1, to supplement the above-mentioned prior art description and as a comparison with the embodiments of the present invention.

Figure 1:
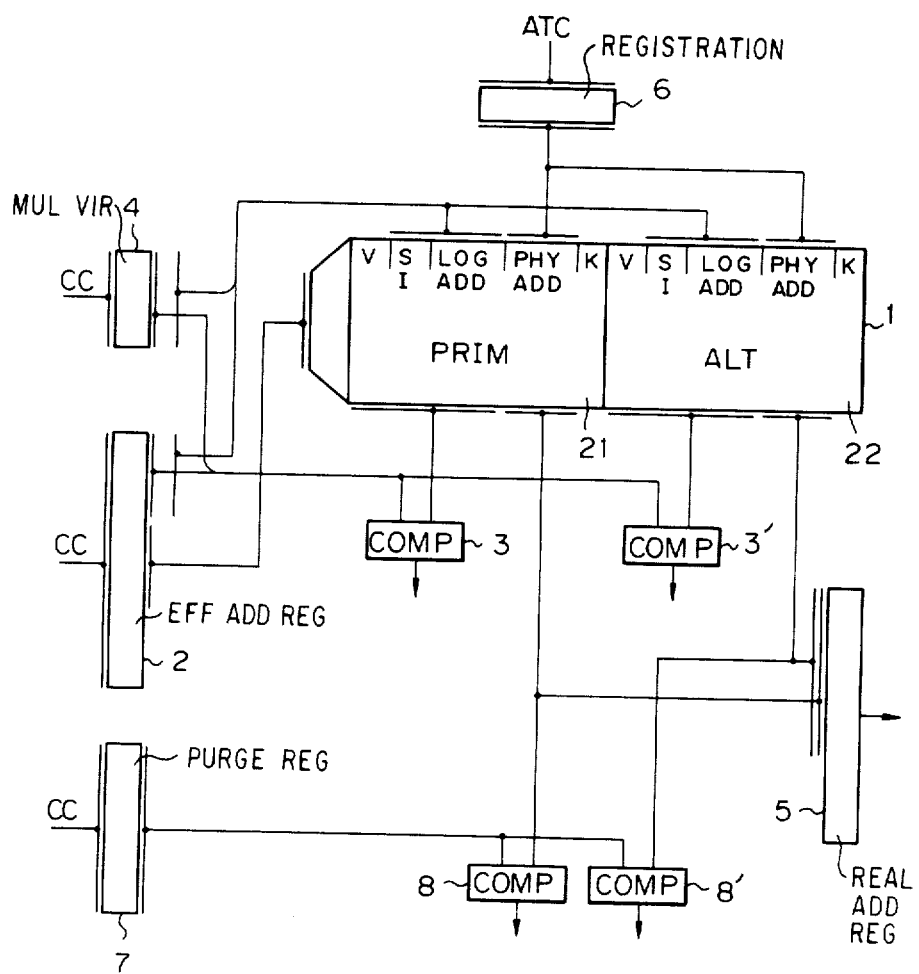
FIG. 1 is a block circuit diagram showing a conventional address translation control system.

In the system in FIG. 1, for an ordinary command fetch or operand access, the address translation buffer 1 is accessed by applying a portion of the logical address to be translated, i.e., an access address from an effective address register 2. By this accessing, the entire contents of the accessed entry stored in the primary block (PRIM) 21 and the alternate block (ALT) 22 in the address translation buffer 1 are read. A multiple virtual storage identification and a partial logical address in each entry, read from the address translation buffer 1 are compared with a multiple virtual storage identification from a multiple virtual storage identification register 4 and a corresponding partial logical address from the effective address register 2, respectively, at the comparator 3 for the primary block 21 and at the comparator 3' for the alternate block 22. If coincidences of the identifications of the comparing contents are obtained, the physical address in the entry is sent to a real address register 5 as a physical address corresponding to a logical address in the effective address register 2.

When the logical address from the effective address register 2 is not stored in the address translation buffer 1, the physical address is obtained by the address translation means using a translation table in a main storage unit. The obtained physical address is sent to a registration register 6 and registered in the address translation buffer 1 with a portion of the logical address and the like.

In a virtual storage system, since the logical address covers a wider range than the utilizable physical address, a physical address, in turn, is allocated to another logical address when the physical address becomes non-utilizable. At that time, if a translation table in a main storage unit is renewed, since pairs of logical addresses and physical addresses translated before the renewal may remain in the address translation buffer 1, the pairs must be searched for and then purged. For this reason, in a conventional address translation control system, as shown in FIG. 1. a partial purge method wherein each entry in the address translation buffer 1 is searched for a physical address, is frequently used. According to this method, when a physical address to be purged is applied to a purge register 7, the access address in the effective address register 2 is sequentially increased, an entry in the address translation buffer 1 is sequentially read, and the physical address in the purge register 7 is compared with the physical address in the address translation buffer 1 at a comparator 8 for the primary block 21 and at a comparator 8' for the alternate block 22. If coincidence is obtained at the comparators, the valid flag of the corresponding entry is made invalid.

When performing partial purging, in such a conventional address translation control system, since the entire contents of the address translation buffer 1 must be read, there is a defect in that the ordinary command fetch operand access cannot be performed using the address translation buffer 1 during the term of the partial purging.

While, even when the coincidence is obtained at the comparator 3 or 3', the stored physical address sometimes cannot be referred. Namely, when the physical address is identical with the physical address set in the purge register 7, the result is as mentioned above; because, in this case, the remaining physical addresses not yet purged in the address translation buffer 1 still exist.

Figure 2:
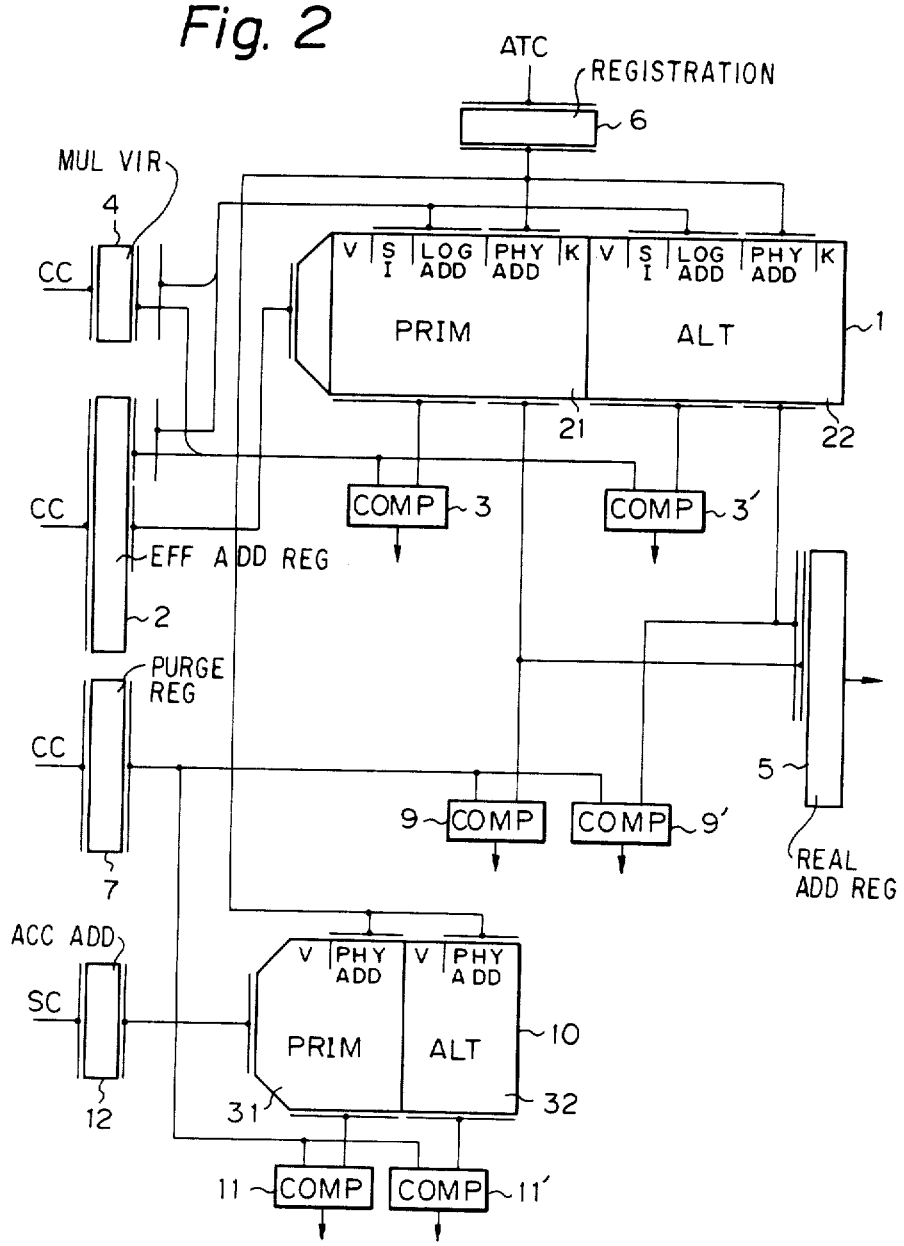
FIG. 2 is a block circuit diagram showing an address translation control system according to a first embodiment of the present invention.

Now, a first embodiment of the present invention is explained with reference to FIG. 2. In FIG. 2, an address translation buffer 1, an effective address register 2, comparators 3 and 3', a multiple virtual storage identification register 4, a real address register 5, a registration register 6, and a purge register 7 are respectively the same as that of the conventional system in FIG. 1. Therefore the same elements are referred by the same reference numbers hereinafter.

The address translation control system of the first embodiment comprises, in addition to the above-mentioned elements, a first comparator which consists of a comparator 9 for the primary block 21 and a comparator 9' for the alternate block 22 in the address translation buffer 1, for comparing the physical address stored in the address translation buffer 1 with the physical address set in the purge register 7, a memory array 10 for storing copies of the valid fl (V) and the physical addresses (PHY ADD) that are entered in the address translation buffer 1, a second comparator which consists of a comparator 11 for the primary block 31 and a comparator 11' for the alternate block 32, for comparing the physical addresses stored in the memory array 10 with the physical addresses set in the purge register 7, and an access address register 12 for accessing the memory array 10. The memory array 10 is connected to the registration register 6.

The operation of the system of the first embodiment is explained as follows. For the ordinary command fetch or operand access, the address translation buffer 1 is carried out by supplying a portion of a logical address to be translated, i.e., an access address from the effective address register 2. By this access, the entire contents of the entry included in the primary block 21 and the alternate block 22 are read out. Multiple virtual storage identifications and portions of the logical addresses from the read out entry are compared with a multiple virtual storage identification from the multiple virtual storage identification register 4 and a portion of the logical address from the effective address register 2, respectively, using the comparators 3 and 3'. Further, the physical addresses of the read out entry are compared with the physical address set in the purge register 7 using the comparators 9 and 9'.

When in either comparator 3 for the primary block 21 or comparator 3' for the alternate block 22, coincidence is not obtained, the address translation is performed by an address translation (not shown) using an address translation table stored in a main storage unit. The physical address thus obtained is set in the registration register 6, and a valid flag (V), a multiple virtual storage identification (SI), a logical address (LOG ADD), a physical address (PHY ADD), and a storage protection key (k) are then registered in the address translation buffer 1. The address in the address translation buffer 1, wherein the above-mentioned valid flag and the like are stored, is also set in the access address register 12. Copies of the valid flag (V) and the physical address (PHY ADD) registered in the address translation buffer 1 are then stored in the address of the memory array which may be accessed from the access address register 12. Then, the address for the next command fetch or operand access is set in the effective address register 2 and the address translation buffer 1 is accessed.

When coincidence of the comparing inputs is obtained at either comparator 3 or 3', if at least one of the physical addresses from the read out entry coincide with the physical address set in the purge register 7 using the comparators 9 and 9', the partial purge operation is not completed and the physical address to be purged remains in the address translation buffer 1. Therefore, the physical address cannot be used. In this case, the command fetch or operand access is controlled to inhibit the translation thereof. Thus, if the coincidence at the comparator 9 or 9' does not occur, the ordinary access is allowed to use the address translation buffer 1 without waiting for the completion of the partial purge.

If coincidence at either comparator 3 or 3' does occur, when the physical address of the read out entry is not identical with the physical address set in the purge register 7 using the comparators 9 and 9', the physical address of the read out entry is sent to the real address register 5. Then, the physical address is used, for example, as an access address for a buffer storage unit or a main storage unit.

The operation where the partial purge is performed is explained below. When the physical address to be purged is set in the purge register 7, the access address in the access address register 12 increases sequentially and each entry of the memory array 10 is accessed in turn. In the access of each entry, the physical address is compared with the physical address in the purge register 7 using the comparators 11 and 11'. If coincidence in the comparators is obtained, the accessed address is applied again to the access address register 12 as an input. Simultaneously, the accessed address is also set in the effective address register 2. Then, the corresponding entries in the address translation buffer 1 and the memory array 10 are accessed and the valid flags of the entries are made invalid. After all the entries of the memory array 10 are searched for by the indication of the access address register 12, those contained in the purge register are deleted, the partial purge operation ends and the purge register 7 is emptied.

As explained above, the partial purge is carried out by using the memory array 10, therefore, for the ordinary command fetch or operand access, the address translation buffer 1 can operate separately from the partial purge. Thus, the confinement for the ordinary access using the address translation buffer 1 by the partial purge operation does not occur. As far as the coincidence in the comparator 9 or 9' is not detected, the physical address from address translation buffer 1 can be applied effectively.

FIG. 3 is a block circuit diagram of an address translation control system applied in a virtual machine according to a second embodiment of the present invention. The virtual machine comprises a plurality of operating systems and a control program by which these operating systems operate simultaneously using one real computer. The control program is allocated in the main storage unit by adding a virtual machine identification (VI) to the plurality of operating systems.

The virtual machine identification is registered in the entry of the address translation buffer 1, therefore, the once-registered virtual machine identification must be partially purged if operation of the corresponding virtual machine is no longer needed or if the virtual machine identification is allocated to another virtual machine due to the capacity of the main storage unit. In this case, as for the first embodiment, the system comprises a memory array and performs a partial purge using the memory array.

In FIG. 3, the elements having the same function as those in FIG. 2 are referred to by the same reference numerals. Further, the virtual machine identification (VI) is registered in the address translation buffer 1, which includes a primary block (PRIM) 23 and an alternate block (ALT) 24. Stored in the memory array 10, which includes a primary block (PRIM) 33 and an alternate block (ALT) 34, are the copies of valid flags (V), virtual machine identifications (VI), and physical addresses (PHY ADD) in the contents of the address translation buffer 1. In this embodiment, the system further comprises a virtual machine identification register 13, a purge virtual machine identification register 14 to set a virtual machine identification to be partially purged, a first comparator including comparators 15 and 15', a second comparator including comparators 16 and 16', a third comparator including comparators 17 and 17', and a fourth comparator including comparators 18 and 18'. The virtual machine identification register 13 is connected to the memory array 10.

In the comparators 3 and 3', the multiple virtual storage identification (SI), the virtual machine identification (VI), and the logical address (LOG ADD) in each entry of the address translation buffer 1 are compared with the multiple virtual storage identification from the multiple virtual storage identification register 4, the virtual machine identification from the virtual machine identification register 13, and the logical address from the effective address register 2, respectively.

In the comparator 15 and 15', the physical addresses of the entry in the address translation buffer 1 are compared with the physical address from the purge register 7. In the comparator 17 and 17', the virtual machine identifications from the address translation buffer 1 are compared with the contents of the purge virtual machine identification register 14. In the comparators 16 and 16', the physical addresses from the memory array 10 are compared with the physical address from the purge register 7. In the comparators 18 and 18', the virtual machine identifications from the memory array 10 are compared with the contents of the purge virtual machine identification register 14.

The operation of this embodiment is basically the same as that of the embodiment of FIG. 2. The partial purge can be carried out with reference to the virtual machine identification.

In addition, the reference letters indicating input units are as follows: ATC (address translation circuit), CC (command control unit), and SC (storage control unit). The output of the real address register 5 is applied to the main storage unit as an access address. The output of the comparators is used as a control signal to control the system as mentioned above.

What is claimed is:

1. An address translation control system comprising:
an access means for accessing an address translation buffer; said address translation buffer stores a plurality of entries of translated addresses, each of said entries including at least a valid flag, a logical address field and physical address field;
purge register containing a physical address to be purged from said address translation buffer;
first comparator means connected to said address translation buffer and said purge register, said first comparator means for comparing said physical address in said purge register with a physical address read from said address translation buffer, wherein use of said physical address from said address translation buffer is enabled when said first comparator means determines said physical address from said address translation buffer does not coincide with said physical address in said purge register, and use of said physical address from said address translation buffer is inhibited when said first comparator means determines said physical address from said address translation buffer does coincide with said physical address in said purge register;

memory array connected to said address translation buffer, said memory array stores copies of said valid flags and said physical addresses from said address translation buffer; and second comparator means connected to said purge register and said memory array, said second comparator means for comparing said physical address in said purge register with a physical address from said memory array, wherein said physical addresses in said memory array are sequentially accessed and compared by said second comparator means, and when said second comparator means determines that said physical address accessed from said memory array coincides with said physical address in said purge register, said coinciding physical address is purged from said address translation buffer and from said memory array.

2. An address translation control system according to claim 1, further including an effective address register containing an access address to be accessed and a multiple virtual storage identification register containing multiple storage identification for said addresses to be accessed by said effective address register.

3. An address translation control system according to claim 1 further comprising an access address register for accessing said memory array which stores the addresses of said plurality of entries in said address translation buffer.

4. An address translation control system according to claim 1 further including a third comparator means for comparing an access address with an address read from said address translation buffer.

5. An address translation control system comprising:

an access means for accessing an address translation buffer;

said address translation buffer stores a plurality of entries of translated addresses, each said entry including at least a valid flag, a logical address field, a physical address field, and a virtual machine identification field;

a purge register containing a physical address to be purged from said address translation buffer;

a purge virtual machine identification register which stores a virtual machine identification to be purged;

a first comparator means connected to said address translation buffer and said purge register, said first comparator means for comparing the address in said purge register with a physical address of a current entry read from said address translation buffer;

a third comparator means being connected to said address translation buffer and said purge virtual machine identification register, third comparator means for comparing a virtual machine identification in said purge virtual machine identification register with a virtual machine identification of said current entry, use of said current entry is enabled when (a) said first means determines said physical address from said address translation buffer does not coincide with said physical address in said purge register and when (b) said third comparator means determines said virtual machine identification from said address translation buffer does not coincide with said virtual machine identification in said purge virtual machine identification register, and use of said current entry is inhibited when (c) said first comparator means determines said physical address from said address translation buffer does coincide with said physical address in said purge register or when (d) said third comparator means determines said virtual machine identification from said address translation buffer coincides with said virtual machine identification in said purge virtual machine identification register;

memory array connected to said address translation buffer, said memory array stores a copy of said valid flag, said virtual machine identification and said physical address from said address translation buffer;

second comparator means connected to said purge register nad said memory array for comparing said physical address in said purge register with a physical addresses read from said memory array; and fourth comparator means connected to said purge virtual machine identification register and said memory array, said fourth comparator means for comparing said of virtual machine identification in said purge virtual machine identification register with said virtual machine identification in said memory array, wherein said virtual machine identifications in said memory array are sequentially accessed and compared by said fourth comparator means, when said fourth comparator means determines that one of said virtual machine identifications of said memory array coincides with said virtual machine identification in said purge virtual machine identification register, said coinciding virtual machine identification is purged from said address translation buffer and from said memory array; said physical addresses in said memory array are sequentially accessed and compared by said second comparator, and when said second comparator determines that one of said physical addresses from said memory array coincides with the physical address in said purge register, said coinciding physical address is purged from said address translation buffer and from said memory array.

6. An address translation control system according to claim 5 further comprising an effective address register containing an effective address, multiple virtual storage identification register containing multiple storage identifications for said effective address of said effective address register and a virtual machine identification register containing virtual machine identifications for said effective address to be accessed by said effective address register.

7. An address translation control system according to claim 5 further including a fifth comparator means for comparing an access address with an address from said address translation buffer.

* * * * *